United States Patent
Xie et al.

(10) Patent No.: US 12,437,205 B2
(45) Date of Patent: Oct. 7, 2025

(54) FOCUSED HYPERPARAMETER TUNING USING ATTRIBUTION

(71) Applicant: Lockheed Martin Corporation, Bethesda, MD (US)

(72) Inventors: Wanlin Xie, Shelton, CT (US); Mauro Joseph Sanchirico, III, Marlton, NJ (US)

(73) Assignee: Lockheed Martin Corporation, Bethesda, MD (US)

( * ) Notice: Subject to any disclaimer, the term of this patent is extended or adjusted under 35 U.S.C. 154(b) by 369 days.

(21) Appl. No.: 18/299,942

(22) Filed: Apr. 13, 2023

(65) Prior Publication Data
US 2024/0346331 A1    Oct. 17, 2024

(51) Int. Cl.
G06K 9/00 (2022.01)
G06N 3/0985 (2023.01)
G06V 10/776 (2022.01)
G06V 10/82 (2022.01)

(52) U.S. Cl.
CPC ......... *G06N 3/0985* (2023.01); *G06V 10/776* (2022.01); *G06V 10/82* (2022.01)

(58) Field of Classification Search
CPC ........ G06N 3/0985; G06N 3/045; G06N 3/08; G06V 10/776; G06V 10/82
See application file for complete search history.

(56) References Cited

U.S. PATENT DOCUMENTS

| | | | |
|---|---|---|---|
| 10,600,005 B2 | 3/2020 | Gunes et al. | |
| 10,810,512 B1 | 10/2020 | Wubbels et al. | |
| 11,003,992 B2 | 5/2021 | Wesolowski et al. | |
| 11,157,812 B2 | 10/2021 | McCourt et al. | |
| 2019/0122141 A1 | 4/2019 | Zhen et al. | |

(Continued)

FOREIGN PATENT DOCUMENTS

| CN | 110889450 A | 3/2020 |
|---|---|---|
| CN | 111047016 A | 4/2020 |

(Continued)

OTHER PUBLICATIONS

Goh, Gary SW, et al. "Understanding integrated gradients with smoothtaylor for deep neural network attribution." 2020 25th International Conference on Pattern Recognition (ICPR). IEEE, 2021 (Year: 2021).*

*Primary Examiner* — Andrew M Moyer
(74) *Attorney, Agent, or Firm* — Baker Botts L.L.P.

(57) ABSTRACT

According to some embodiments, a method includes determining test predictions by performing an inference process using a checkpointed learning model and test vectors. The checkpointed learning model includes hyperparameters and weights. The method further includes determining an attribution map by performing one or more attribution processes using the test predictions and the test vectors. The method further includes determining a score for each particular hyperparameter by analyzing the attribution map using an association classifier. The method further includes determining, based on the analysis by the association classifier, whether each particular hyperparameter should be frozen or tuned again. The method further includes updating the hyperparameters and weights of the neural network when it is determined that at least one particular hyperparameter should be tuned again.

20 Claims, 3 Drawing Sheets

(56) References Cited

U.S. PATENT DOCUMENTS

| | | |
|---|---|---|
| 2019/0244139 A1 | 8/2019 | Varadarajan et al. |
| 2019/0318248 A1 | 10/2019 | Moreira-Matias et al. |
| 2021/0264263 A1* | 8/2021 | Walters .................. G06N 3/045 |
| 2022/0392637 A1* | 12/2022 | Kollada .................. G16H 50/30 |
| 2024/0273400 A1* | 8/2024 | Boué .................... G06N 3/0985 |

FOREIGN PATENT DOCUMENTS

| | | |
|---|---|---|
| CN | 111553482 A | 8/2020 |
| CN | 113723615 A | 11/2021 |
| IN | 201821025560 | 9/2018 |
| IN | 113673174 A | 11/2021 |
| KR | 102107378 B | 4/2020 |
| TW | I7332708 B | 7/2021 |

* cited by examiner

FOCUSED HYPERPARAMETER TUNING USING ATTRIBUTION

TECHNICAL FIELD

This disclosure generally relates to hyperparameters, and more specifically to focused hyperparameter tuning using attribution.

BACKGROUND

Hyperparameters are parameters whose values are used to control a machine learning process. Hyperparameter optimization or tuning is the process of choosing the optimal set of hyperparameters when training a learning model. Hyperparameter tuning has often been a manual task executed by engineers, who often employ heuristics and intuition to select hyperparameters.

BRIEF DESCRIPTION OF THE DRAWINGS

For a more complete understanding of the disclosed embodiments and their features and advantages, reference is now made to the following description, taken in conjunction with the accompanying drawings, in which.

DESCRIPTION OF EXAMPLE EMBODIMENTS

Overview

Figure 1:
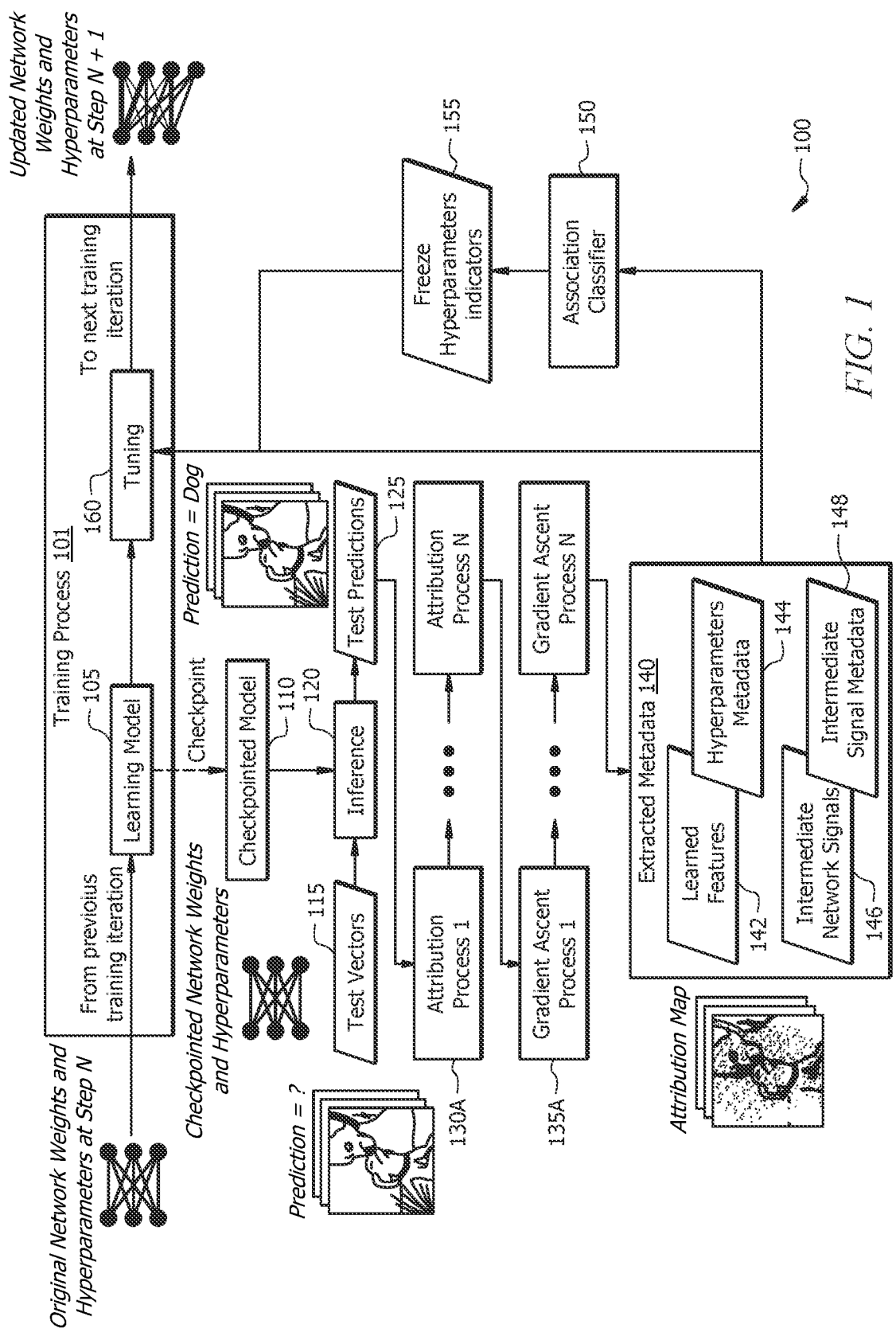
FIG. 1 illustrates an example of a hyperparameter training system, in accordance with certain embodiments.

The present disclosure relates generally to systems and methods for tuning hyperparameters of a neural network using attribution. According to one or more embodiments of the disclosure, a method for tuning hyperparameters includes determining test predictions by performing an inference process using a checkpointed learning model and test vectors. The checkpointed learning model includes hyperparameters and weights. The method further includes determining an attribution map by performing one or more attribution processes using the test predictions and the test vectors. The method further includes determining a score for each particular hyperparameter by analyzing the attribution map using an association classifier. The method further includes determining, based on the analysis by the association classifier, whether each particular hyperparameter should be frozen or tuned again. The method further includes updating the hyperparameters and weights of the neural network when it is determined that at least one particular hyperparameter should be tuned again. Other embodiments are described below, and this overview is not meant to limit the scope of the present disclosure.

Technical advantages of certain embodiments of this disclosure may include one or more of the following. Certain systems and methods described herein provide systems and methods for tuning hyperparameters using attribution. Unlike existing solutions that may require manual tuning of hyperparameters by engineers, embodiments of this disclosure provide systems and methods that utilize attribution and association functions to automatically tune hyperparameters without requiring manual intervention. To do so, systems and methods described herein leverage post-hoc explainability information obtained from model predictions as evaluated at reoccurring checkpoints during the training process. First, the learning model is checkpointed at recurring interval in training time. The outer training loop may use current public domain and well-known methodologies (e.g., random search, SGD, PBT, etc.). At the checkpoint, the current set of hyperparameters are obtained and a set of feature attributions are computed using feature attribution methods on the test dataset of the model. By identifying a set of hyperparameters that have contributed to attributed features, the search of a subset of hyperparameters can be frozen, thereby decreasing the size of the search and reducing required computing resources (e.g., computing power and memory). Next, a set of intermediate neuron output signals are extracted using, for example, gradient ascent. The intermediate outputs are then passed to a pretrained association classifier which outputs a decision about whether or not the current hyperparameters are contributing to correct intermediate signals within the network. For example, if edge detection is a necessary intermediate step, the association classifier will determine whether or not clean edges are present in the intermediate signals. If the association classifier determines that a hyperparameter needs to be tuned further, the weights and hyperparameters of the learning model are updated. Otherwise, if the association classifier determines that a hyperparameter whose mapped features scored high (e.g., strong edge detection, knowledge of background, etc.), that hyperparameter is frozen and not updated further. Other technical advantages will be readily apparent to one skilled in the art from the following figures, descriptions, and claims. Moreover, while specific advantages have been enumerated above, various embodiments may include all, some, or none of the enumerated advantages.

Example Embodiments

The present disclosure relates generally to using attribution to choose an optimal set of hyperparameters when training a learning model. Hyperparameters are parameters whose values are used to control a machine learning process. Hyperparameter optimization or tuning is the process of choosing the optimal set of hyperparameters when training a learning model. Hyperparameter tuning has often been a manual task executed by engineers, who often employ heuristics and intuition to select hyperparameters.

Some hyperparameter tuning approaches focus on efficient ways of exploring the hyperparameter search space by utilizing distributed training, population-based training, and various local and global optimization techniques. These methods aim to reduce the task of tuning hyperparameters by leveraging parallelizable hardware and testing hyperparameter configurations in parallel. However, several challenges make searching the hyperparameter space difficult, even when using such state-of-the-art search methods. First, with a large amount of hyperparameter values for which to search, finding the optimal set of hyperparameters is a time intensive and resource consuming task. Global and local optimization algorithms often require a long time to even execute a single iteration of the search space. Analytical forms for gradients are often unknown, thus excluding algorithms which rely on the Jacobian and the Hessian.

Second, most state-of-the-art neural network architectures have many hidden layers of intermediate processing, wherein the architecture of each layer is defined by its own set of hyperparameters. Due to the nested nonlinear form of the network, changes in hyperparameters are not directly proportional to changes in network outputs and thus not directly proportional to changes in accuracy metrics. The complex, nonlinear, non-convex nature of the search problem makes it hard to evaluate if each round of optimization is actually moving toward the end goal of making a more accurate model.

Third, metrics which evaluate success during hyperparameter search are not indicative of intermediate progress when searching the hyperparameter space. For example, if the hyperparameters associated with an early network layer are chosen correctly but the hyperparameters associated with a later layer have not reached an equilibrium yet in the optimization process, the results tabulated from the output of the network will not show intermediate progress and might not even improve at all.

Finally, hyperparameter tuning is well known to be a cause of overfitting in models. Without introducing explainability checks to reveal if neural network models are actually using the right information to make a reliable decision, there is no guarantee that a more accurate model in training will yield more robust decisions in the field. Even when evaluating fitting and tuning success on folded datasets, there is a well-known problem of generalization across datasets, to new data in the field. There is a strong need to tune hyperparameters in such a way that increases robustness instead of just increasing training accuracy.

In summary, hyperparameter optimization is challenging because: (1) there are too many parameters to search; (2) the complex relationship between values and success metrics impedes optimization; (3) there is no way to evaluate intermediate success in finding some but not all of the hyperparameters; and (4) hyperparameter tuning may lead to a more accurate but less robust model.

To address these and other problems associated with typical hyperparameter tuning approaches, the enclosed embodiments use attribution and association processes to automatically choose an optimal set of hyperparameters when training a learning model. To do so, systems and methods described herein aim to reduce the random aspect of searching for the next hyperparameter configuration by leveraging post-hoc explainability information obtained from model predictions as evaluated at reoccurring checkpoints during the training process. First, the learning model is checkpointed at recurring interval in training time. The outer training loop may use current public domain and well-known methodologies (e.g., random search, SGD, PBT, etc.). At the checkpoint, the current set of hyperparameters are obtained and a set of feature attributions are computed using feature attribution methods on the test dataset of the model. By identifying a set of hyperparameters that have contributed to attributed features, the search of a subset of hyperparameters can be frozen, thereby decreasing the size of the search and reducing required computing resources (e.g., computing power and memory). Next, a set of intermediate neuron output signals are extracted using, for example, gradient ascent. The intermediate outputs are then passed to a pretrained association classifier which outputs a decision about whether or not the current hyperparameters are contributing to correct intermediate signals within the network. For example, if edge detection is a necessary intermediate step, the association classifier will determine whether or not clean edges are present in the intermediate signals. If the association classifier determines that a hyperparameter needs to be tuned further, the weights and hyperparameters of the learning model are updated. Otherwise, if the association classifier determines that a hyperparameter whose mapped features scored high (e.g., strong edge detection, knowledge of background, etc.), that hyperparameter is frozen and not updated further.

FIG. 1 is a schematic block diagram of an example hyperparameter training system 100, according to certain embodiments. In some embodiments, hyperparameter training system 100 includes a training process 101, an attribution process 130, and an association classifier 150. In general, hyperparameter training system 100 utilizes attribution process 130 and association classifier 150 to automatically choose an optimal set of hyperparameters for training process 101 in order to train a learning model.

Training process 101 is any typical training process for training a learning model 105. Training process 101 uses multiple iterations to train learning model 105. At step N of the training process, the network has certain weights and hyperparameters. At each step in training process 101, the network weights and hyperparameters are saved in memory for analysis. The input for the first step of training process 101 is an untrained neural network. The neural network is a set of transformations (e.g., linear transformations) that are executed by multiplying a matrix of weights over an input which could be, for example, the pixels of an image. Others are executed by convolving a vector of weights (i.e., a "filter") over the pixels of an image. After linear layers, a nonlinear or an activation function may be used (e.g., a rectified linear unit, a hyperbolic tangent, or other nonlinear function). A neural network is formed by stacking these linear layers and nonlinear layers. The input of the neural network itself is an image and the output may be a decision about what is in that image (e.g., an image of a dog or cat).

In general, not only is the neural network itself a process, but the process by which the weights are tuned and the process by which it is determined how many weights and layers are needed is also a process to be defined. In sum, there is the process by which the classification is performed, and there is the process by which the steps in the neural network itself are determined. The latter would be called training and the former would be called inference. The disclosed embodiments provided improvements to the training process rather than the inference process.

The inputs to training process 101 are weights and hyperparameters. Hyperparameters are parameters that define how many weights, how many layers, and how many weights in each of those layers. A gradient is a computer algorithm which determines which direction to turn each of the weights. The gradient indicates that the algorithm that trains the model has to adjust the weights by some degree and determines to what degree and in what direction the weights need to be adjusted.

As training process 101 is executed, the model is checkpointed at certain intervals to produce a checkpointed model 110. Checkpointing is a standard process by which the weights and hyperparameters are saved. The hyperparameters define how many of those weights are needed and how many layers exist in the network. Once the model is checkpointed, some images, signals, etc. (i.e., "test vectors") are passed to inference process 120 to obtain a test prediction 125. For example, test vectors 115 (e.g., images) are passed into inference process 120. Inference process 120 utilizes checkpointed model 110 to output a test prediction 125 of what was in that image (e.g., "dog").

Next, hyperparameter training system 100 utilizes attribution process 130, which is one novel feature of tuning hyperparameters by hyperparameter training system 100. In general, attribution process 130 determines which parts of an image or which pixels of that image (e.g., test vector 115)

caused the prediction that was inferred. For example, if an image was input into the neural network and the output indicated that the image contained a dog, attribution process 130 determines which parts/pixels of the input image caused the "dog" prediction. In some embodiments, output indications may be defined by a one hot encoding—where there are multiple neurons at the output of the network and the neuron that corresponds to that particular class gets "hot" (i.e., its value rises when the neuron is of that particular class). For example, if there are only two classes (e.g., cats and dogs), then there would just be one output and that output would be low for a cat and high for a dog. If there are more classes (e.g., birds, cats, and dogs), there would be an output for each (e.g., three outputs in this example).

To determine which parts/pixels of an image caused the prediction that was inferred, attribution process 130 searches for images or perturbations about an image. For example, starting with a dog image as an input, attribution process 130 perturbs or slightly adjusts the pixels in that image to make the dog output as hot or as high valued as possible. And then the pixels which are determined to be most significant in producing the dog output are the ones that get highlighted in that attribution map (e.g., in the bottom left of FIG. 1). Any appropriate algorithm may be used by attribution process 130. For example, an integrated gradients algorithm or a gradient ascent process 135 may be used by attribution process 130 to change/perturb the values of the pixels and then integrate the gradient at the output, thereby taking the integral over the change. The largest change over the duration of the perturbation is used by attribution process 130 to assess the importance.

The outputs of attribution process 130 include extracted metadata 140, which are components of the extracted attribution map. Extracted metadata 140 may include learned features 142, hyperparameter metadata 144, intermediate network signals 146, and intermediate signal metadata 148. The extracted attribution map may be represented as heat maps, and the heat maps themselves are images that indicate the importance attributed to features, edges, and the like (e.g., eyes/cars/nose of a dog, the wheels or the windshield of a car, etc.). Extracted metadata 140 indicates what hyperparameters are associated with the extracted attribution map. Extracted metadata 140 defines how many weights in a layer, how many layers there are, and the size of the input and output of each layer. In general, extracted metadata 140 keeps a record of the tuning process so that the algorithm knows the history and avoids, for example, a combination that has already been tuned.

Learned features 142 reveal the pixels of a test vectors 115 (e.g., an image) that were most important to the decision that the test vector 115 contains a specific test prediction 125 (e.g., a dog). In some embodiments, learned features 142 are determined via integrated gradients. Examples of learned features 142 include the eyes, nose, and mouth shape of a dog, their collars, and shape of their heads.

Hyperparameter metadata 144 are data structures which keep track of which hyperparameters have been tuned to result in learned features 142. Examples of hyperparameter metadata 144 include records of how many hidden neurons are used in each layer of a network, how many layers the network had, and what type of activation functions were used (e.g., hyperbolic tangent or rectified linear unit).

Intermediate network signals 146 are the values at the inputs and outputs of the hidden neurons inside the network. An example of intermediate network signals 146 are the network signals which activate in the presence of eyes, cars, and other features characteristic of the objects to be classified.

Intermediate signal metadata 148 are data structures tracking which intermediate signals were measured and how those intermediate signals relate to the attribution maps. An example of intermediate signal metadata 148 is a data structure which indicates that the output of the Nth neuron in the Mth layer was measured and further indicates which association map (e.g., a map showing importance attributed to a dog collar) corresponds to high excitation in that neuron.

Extracted metadata 140 (i.e., the attribution maps) from attribution process 130 are passed to association classifier 150. In general, for each learned feature 142, (e.g., edges, background space, etc.), the association classifier 150 determines if the model has focused on these features or not. Based on the output of association classifier 150, the hyperparameters whose mapped features scored high (e.g. strong edge detection, knowledge of background, etc.) are frozen and the remaining hyperparameters are tuned again in the next iteration. More details about association classifier 150 are below.

Association classifier 150 is another neural network which is trained to take the job of an engineer that typically supervises the hyperparameter tuning process. Association classifier 150 determines whether an attribution map from attribution process 130 is indicative of a well-trained or a poorly-trained classifier. If association classifier 150 determines that the attribution map is indicative of a well-trained classifier, association classifier 150 outputs a freeze hyperparameter indicator 155 that indicates to freeze the hyperparameters. Otherwise, association classifier 150 outputs an indication 155 to update the hyperparameters. In general, freeze hyperparameter indicator 155 is a binary decision whether to freeze or update each hyperparameter. For example, if association classifier 150 had too many hidden weights, association classifier 150 would be more likely to overfit and to start classifying these images of cats versus dogs based on incorrect features (e.g., the background) rather than actually on the features that would comprise a cat face or a dog face. Association classifier 150 would realize that the importance is not being attributed to the actual features of the dogs and cats to be classified and would therefore not issue the freeze hyperparameter indicator 155 (but instead issue an update hyperparameter indicator 155). This indicates that this algorithm has a poorly tuned set of hyperparameters and the tuning process would continue to try more or less hidden weights until it found a combination that worked successfully. On the other hand, when the importance is attributed to the correct features, the tuning process should stop since the algorithm is well tuned. This is illustrated in the upper right corner of FIG. 1 by adding another set of weights to the previous layers. In this example, there were initially three sets of weights and then the algorithm decided that four sets were needed. Also in this example, the weights were tuned, which is represented by the changes in the thickness of the lines. This iterative process may continue multiple times (e.g., hundreds of times) until the system finds the right combinations of both the weights and the number of weights at each step in the neural networks inference process to obtain a robust classification.

Figure 2:
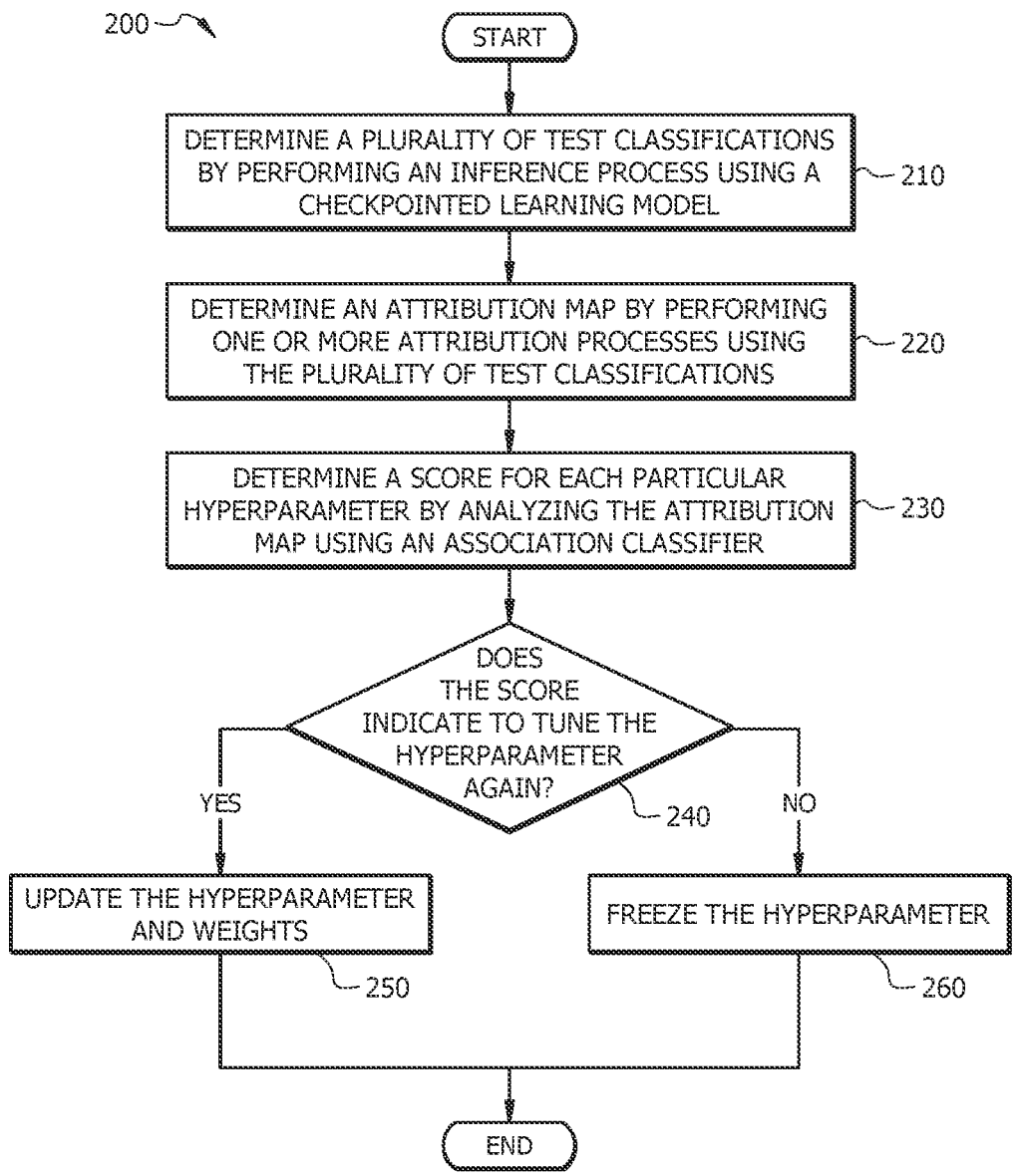
FIG. 2 illustrates an example of a method for providing hyperparameter training using attribution, in accordance with certain embodiments.

FIG. 2 is a flow diagram illustrating an example method 200 for tuning hyperparameters using attribution. Method 200 may begin in step 210 where method 200 determines a plurality of test predictions by performing an inference process using a checkpointed learning model of the neural network and a plurality of test vectors. The checkpointed learning model includes a plurality of hyperparameters and a plurality of weights. In some embodiments, the plurality of test predictions are test predictions 125 and the inference process is inference process 120. In some embodiments, the checkpointed learning model is checkpointed model 110 and the plurality of test vectors are test vectors 115. In some embodiments, the test vectors are images. After step 210, method 200 proceeds to step 220.

At step 220, method 200 determines an attribution map by performing one or more attribution processes using the plurality of test predictions and the plurality of test vectors. In some embodiments, the attribution map includes a plurality of learned features. The learned features may be learned features 142. In some embodiments, the one or more attribution processes of step 220 may include a gradient ascent process that comprises an integrated gradient algorithm. After step 220, method 200 proceeds to step 230.

At step 230, method 200 determines a score for each particular hyperparameter of the plurality of hyperparameters of the checkpointed learning model by analyzing the attribution map using an association classifier. In some embodiments, the associate classifier is association classifier 150. In some embodiments, the associate classifier is a second neural network. In some embodiments, the attribution methods of step 220 produce an "importance" score on each feature. This score is how "important" the model perceives the features to be when determining the final output. The association classifier of step 230 maps subsets of the hyperparameters to the features, and the corresponding feature scores from the attribution methods will affect how much to tune each hyperparameter. Any appropriate algorithm for computing importance scores may be used. As a first example, a saliency map, which is computed by determining the gradient of the output of the neural network with respect to each input value in the test image, may be used. As a second example, an integrated gradients algorithm may be used to compute importance scores. An integrated gradients algorithm computes the integral of the gradients along a perturbation about the pixels of the test image and multiplies each integral value with the length of the perturbation of the respective pixel to obtain the importance value for that pixel. As a third example, an occlusion algorithm may be used to compute importance scores. Occlusion defines importance as the magnitude of the change in neural network output when the given input pixel is occluded by baseline data (e.g., replaced with 0's).

The importance scores for each pixel in the test image may include a new image or set of images if multiple important value computation methods are employed. Those images may then be passed as inputs to the association classifier of step 230. The association classifier accepts the importance values as input and then returns a decision on whether or not to stop tuning or to continue tuning each hyperparameter. The decisions of the association classifier may be represented as a vector where each element corresponds to a hyperparameter. If the corresponding element is a "1," then tuning for that hyperparameter continues in the next epoch. If the corresponding element is a "0," then tuning for that hyperparameter is frozen. In some embodiments, a search field of each hyperparameter may be set by a user in terms of which values to try. For example, a learning rate may be set to values such as [0.001, 0.005, 0.01]. The importance score may then be used to determine whether or not to change (i.e., tune) the respective hyperparameter. For example, if the importance score is 0, then the hyperparameter may be frozen and not tuned further. If the importance score is 1, then a new hyperparameter value may be choses from the specified search field for that hyperparameter (e.g. if current 1r=0.001, try 0.005).

At step 240, method 200 determines, based on the analysis by the association classifier of step 230, whether each particular hyperparameter of the plurality of hyperparameters of the checkpointed learning model should be frozen or tuned again. In some embodiments, determining whether each particular hyperparameter of the plurality of hyperparameters should be frozen or tuned again comprises comparing the score of each particular hyperparameter to a predetermined threshold. If it is determined in step 230 that a particular hyperparameter of the checkpointed learning model should be tuned again, method 200 proceeds to step 250 where the plurality of hyperparameters and the plurality of weights of the neural network are updated. If, however, it is determined in step 230 that a particular hyperparameter of the checkpointed learning model should be not tuned again, method 200 proceeds to step 260 where the plurality of hyperparameters and the plurality of weights of the neural network are frozen (i.e., not updated). After steps 250 or 260, method 200 may end.

Figure 3:
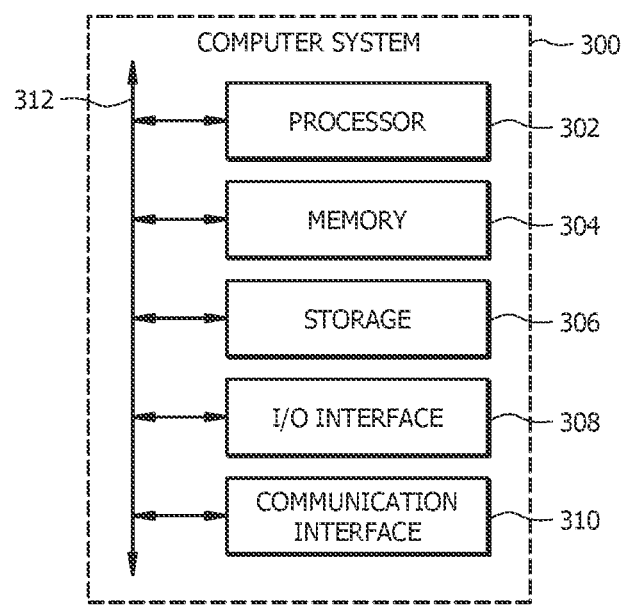
FIG. 3 illustrates an example of a computer system, in accordance with certain embodiments.

FIG. 3 illustrates an example computer system 300. In particular embodiments, one or more computer systems 300 perform one or more steps of one or more methods described or illustrated herein. In particular embodiments, one or more computer systems 300 provide functionality described or illustrated herein. In particular embodiments, software running on one or more computer systems 300 performs one or more steps of one or more methods described or illustrated herein or provides functionality described or illustrated herein. Particular embodiments include one or more portions of one or more computer systems 300. Herein, reference to a computer system may encompass a computing device, and vice versa, where appropriate. Moreover, reference to a computer system may encompass one or more computer systems, where appropriate.

This disclosure contemplates any suitable number of computer systems 300. This disclosure contemplates computer system 300 taking any suitable physical form. As example and not by way of limitation, computer system 300 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 300 may include one or more computer systems 300; be unitary or distributed; span multiple locations; span multiple machines; span multiple data centers; or reside in a cloud, which may include one or more cloud components in one or more networks. Where appropriate, one or more computer systems 300 may perform without substantial spatial or temporal limitation one or more steps of one or more methods described or illustrated herein. As an example and not by way of limitation, one or more computer systems 300 may perform in real time or in batch mode one or more steps of one or more methods described or illustrated herein. One or more computer systems 300 may perform at different times or at different locations one or more steps of one or more methods described or illustrated herein, where appropriate.

In particular embodiments, computer system 300 includes a processor 302, memory 304, storage 306, an input/output (I/O) interface 308, a communication interface 310, and a bus 312. Although this disclosure describes and illustrates a particular computer system having a particular number of particular components in a particular arrangement, this disclosure contemplates any suitable computer system having any suitable number of any suitable components in any suitable arrangement.

In particular embodiments, processor 302 includes hardware for executing instructions, such as those making up a computer program. As an example and not by way of limitation, to execute instructions, processor 302 may retrieve (or fetch) the instructions from an internal register, an internal cache, memory 304, or storage 306; decode and execute them; and then write one or more results to an internal register, an internal cache, memory 304, or storage 306. In particular embodiments, processor 302 may include one or more internal caches for data, instructions, or addresses. This disclosure contemplates processor 302 including any suitable number of any suitable internal caches, where appropriate. As an example and not by way of limitation, processor 302 may include one or more instruction caches, one or more data caches, and one or more translation lookaside buffers (TLBs). Instructions in the instruction caches may be copies of instructions in memory 304 or storage 306, and the instruction caches may speed up retrieval of those instructions by processor 302. Data in the data caches may be copies of data in memory 304 or storage 306 for instructions executing at processor 302 to operate on; the results of previous instructions executed at processor 302 for access by subsequent instructions executing at processor 302 or for writing to memory 304 or storage 306; or other suitable data. The data caches may speed up read or write operations by processor 302. The TLBs may speed up virtual-address translation for processor 302. In particular embodiments, processor 302 may include one or more internal registers for data, instructions, or addresses. This disclosure contemplates processor 302 including any suitable number of any suitable internal registers, where appropriate. Where appropriate, processor 302 may include one or more arithmetic logic units (ALUs); be a multi-core processor; or include one or more processors 302. Although this disclosure describes and illustrates a particular processor, this disclosure contemplates any suitable processor.

In particular embodiments, memory 304 includes main memory for storing instructions for processor 302 to execute or data for processor 302 to operate on. As an example and not by way of limitation, computer system 300 may load instructions from storage 306 or another source (such as, for example, another computer system 300) to memory 304. Processor 302 may then load the instructions from memory 304 to an internal register or internal cache. To execute the instructions, processor 302 may retrieve the instructions from the internal register or internal cache and decode them. During or after execution of the instructions, processor 302 may write one or more results (which may be intermediate or final results) to the internal register or internal cache. Processor 302 may then write one or more of those results to memory 304. In particular embodiments, processor 302 executes only instructions in one or more internal registers or internal caches or in memory 304 (as opposed to storage 306 or elsewhere) and operates only on data in one or more internal registers or internal caches or in memory 304 (as opposed to storage 306 or elsewhere). One or more memory buses (which may each include an address bus and a data bus) may couple processor 302 to memory 304. Bus 312 may include one or more memory buses, as described below. In particular embodiments, one or more memory management units (MMUs) reside between processor 302 and memory 304 and facilitate accesses to memory 304 requested by processor 302. In particular embodiments, memory 304 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 304 may include one or more memories 304, where appropriate. Although this disclosure describes and illustrates particular memory, this disclosure contemplates any suitable memory.

In particular embodiments, storage 306 includes mass storage for data or instructions. As an example and not by way of limitation, storage 306 may include a hard disk drive (HDD), a floppy disk drive, flash memory, an optical disc, a magneto-optical disc, magnetic tape, or a Universal Serial Bus (USB) drive or a combination of two or more of these. Storage 306 may include removable or non-removable (or fixed) media, where appropriate. Storage 306 may be internal or external to computer system 300, where appropriate. In particular embodiments, storage 306 is non-volatile, solid-state memory. In particular embodiments, storage 306 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 306 taking any suitable physical form. Storage 306 may include one or more storage control units facilitating communication between processor 302 and storage 306, where appropriate. Where appropriate, storage 306 may include one or more storages 306. Although this disclosure describes and illustrates particular storage, this disclosure contemplates any suitable storage.

In particular embodiments, I/O interface 308 includes hardware, software, or both, providing one or more interfaces for communication between computer system 300 and one or more I/O devices. Computer system 300 may include one or more of these I/O devices, where appropriate. One or more of these I/O devices may enable communication between a person and computer system 300. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 308 for them. Where appropriate, I/O interface 308 may include one or more device or software drivers enabling processor 302 to drive one or more of these I/O devices. I/O interface 308 may include one or more I/O interfaces 308, where appropriate. Although this disclosure describes and illustrates a particular I/O interface, this disclosure contemplates any suitable I/O interface.

In particular embodiments, communication interface 310 includes hardware, software, or both providing one or more interfaces for communication (such as, for example, packet-based communication) between computer system 300 and one or more other computer systems 300 or one or more networks. As an example and not by way of limitation, communication interface 310 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 310 for it. As an example and not by way of limitation, computer system 300 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 300 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network, a Long-Term Evolution (LTE) network, or a 5G network), or other suitable wireless network or a combination of two or more of these. Computer system 300 may include any suitable communication interface 310 for any of these networks, where appropriate. Communication interface 310 may include one or more communication interfaces 310, where appropriate. Although this disclosure describes and illustrates a particular communication interface, this disclosure contemplates any suitable communication interface.

In particular embodiments, bus 312 includes hardware, software, or both coupling components of computer system 300 to each other. As an example and not by way of limitation, bus 312 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 312 may include one or more buses 312, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

The embodiments disclosed herein are only examples, and the scope of this disclosure is not limited to them. Particular embodiments may include all, some, or none of the components, elements, features, functions, operations, or steps of the embodiments disclosed herein. Certain embodiments are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

The invention claimed is:

1. A system for training a neural network, the system comprising:
 one or more memory units; and
 a processor communicatively coupled to the one or more memory units, the processor configured to:
  determine a plurality of test predictions by performing an inference process using a checkpointed learning model of the neural network and a plurality of test vectors, wherein the checkpointed learning model comprises a plurality of hyperparameters and a plurality of weights;
  determine an attribution map by performing one or more attribution processes using the plurality of test predictions and the plurality of test vectors;

determine a score for each particular hyperparameter of the plurality of hyperparameters by analyzing the attribution map using an association classifier;

determine, based on the analysis by the association classifier, whether each particular hyperparameter of the plurality of hyperparameters should be frozen or tuned again; and when it is determined that at least one particular hyperparameter should be tuned again, update the plurality of hyperparameters and the plurality of weights of the neural network.

2. The system of claim 1, wherein the attribution map comprises a plurality of learned features.

3. The system of claim 1, wherein the plurality of test vectors comprises a plurality of images.

4. The system of claim 1, wherein the one or more attribution processes comprises a gradient ascent process that comprises an integrated gradient algorithm.

5. The system of claim 1, wherein determining whether each particular hyperparameter of the plurality of hyperparameters should be frozen or tuned again comprises comparing the score of each particular hyperparameter to a predetermined threshold.

6. The system of claim 1, wherein the association classifier comprises a second neural network.

7. A method by a computing system, the method comprising:

determining a plurality of test predictions by performing an inference process using a checkpointed learning model of the neural network and a plurality of test vectors, wherein the checkpointed learning model comprises a plurality of hyperparameters and a plurality of weights;

determining an attribution map by performing one or more attribution processes using the plurality of test predictions and the plurality of test vectors;

determining a score for each particular hyperparameter of the plurality of hyperparameters by analyzing the attribution map using an association classifier;

determining, based on the analysis by the association classifier, whether each particular hyperparameter of the plurality of hyperparameters should be frozen or tuned again; and when it is determined that at least one particular hyperparameter should be tuned again, updating the plurality of hyperparameters and the plurality of weights of the neural network.

8. The method of claim 7, wherein the attribution map comprises a plurality of learned features.

9. The method of claim 7, wherein the plurality of test vectors comprises a plurality of images.

10. The method of claim 7, wherein determining the attribution map further comprises utilizing one or more gradient ascent processes.

11. The method of claim 10, wherein the one or more gradient ascent processes comprises an integrated gradient algorithm.

12. The method of claim 7, wherein determining whether each particular hyperparameter of the plurality of hyperparameters should be frozen or tuned again comprises comparing the score of each particular hyperparameter to a predetermined threshold.

13. The method of claim 7, wherein the association classifier comprises a second neural network.

14. One or more computer-readable non-transitory storage media embodying instructions that, when executed by a processor, cause the processor to perform operations comprising:

determining a plurality of test predictions by performing an inference process using a checkpointed learning model of the neural network and a plurality of test vectors, wherein the checkpointed learning model comprises a plurality of hyperparameters and a plurality of weights;

determining an attribution map by performing one or more attribution processes using the plurality of test predictions and the plurality of test vectors;

determining a score for each particular hyperparameter of the plurality of hyperparameters by analyzing the attribution map using an association classifier;

determining, based on the analysis by the association classifier, whether each particular hyperparameter of the plurality of hyperparameters should be frozen or tuned again; and when it is determined that at least one particular hyperparameter should be tuned again, updating the plurality of hyperparameters and the plurality of weights of the neural network.

15. The one or more computer-readable non-transitory storage media of claim 14, wherein the attribution map comprises a plurality of learned features.

16. The one or more computer-readable non-transitory storage media of claim 14, wherein the plurality of test vectors comprises a plurality of images.

17. The one or more computer-readable non-transitory storage media of claim 14, wherein determining the attribution map further comprises utilizing one or more gradient ascent processes.

18. The one or more computer-readable non-transitory storage media of claim 17, wherein the one or more gradient ascent processes comprises an integrated gradient algorithm.

19. The one or more computer-readable non-transitory storage media of claim 14, wherein determining whether each particular hyperparameter of the plurality of hyperparameters should be frozen or tuned again comprises comparing the score of each particular hyperparameter to a predetermined threshold.

20. The one or more computer-readable non-transitory storage media of claim 14, wherein the association classifier comprises a second neural network.

* * * * *